(12) United States Patent
McCracken, Jr.

(10) Patent No.: US 11,656,842 B2
(45) Date of Patent: *May 23, 2023

(54) PRESENTATION LAYER FOR PORTABLE ELECTRONIC ASSISTANT

(71) Applicant: T-MOBILE INNOVATIONS LLC, Overland Park, KS (US)

(72) Inventor: Billy G. McCracken, Jr., Lenexa, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 179 days.

This patent is subject to a terminal disclaimer.

(21) Appl. No.: 16/874,576

(22) Filed: May 14, 2020

(65) Prior Publication Data

US 2021/0357178 A1 Nov. 18, 2021

(51) Int. Cl.
*G06F 3/16* (2006.01)
*G06F 11/34* (2006.01)
(Continued)

(52) U.S. Cl.
CPC ............ *G06F 3/167* (2013.01); *G05B 15/02* (2013.01); *G06F 11/3438* (2013.01);
(Continued)

(58) Field of Classification Search
CPC .. G06F 3/167; G06F 11/3438; G06F 11/3013; G05B 15/02; G05B 2219/2642;
(Continued)

(56) References Cited

U.S. PATENT DOCUMENTS 10,031,722 B1 * 7/2018 Mutagi ............... H04L 12/2816
11,070,538 B1 7/2021 McCracken
(Continued)

FOREIGN PATENT DOCUMENTS

WO 2021231670 A1 11/2021

OTHER PUBLICATIONS

Foreign Communication From a Related Counterpart Application, International Search Report and Written Opinion dated Nov. 5, 2021, International Application No. PCT/US2021/32118 filed on May 13, 2021.
(Continued)

*Primary Examiner* — Cesar B Paula
*Assistant Examiner* — Zelalem Shalu

(57) ABSTRACT

A method of controlling an environment using a roaming electronic assistant. The method comprises capturing a plurality of associations of voice commands to device commands coded for a first electronic assistant (EA) device by a home electronic assistant (EA) client application, where each association links a voice command to a corresponding device command coded for the first EA device, and where the first EA device takes action in a home environment based on the voice commands, sending the associations of voice commands to device commands coded for the first EA device to an EA client application executing on a computer system, and building a mapping of the associations for the first EA device to associations for a second EA device by the EA client application, where each association for the second EA device links a voice command to a device command coded for the second EA device.

17 Claims, 5 Drawing Sheets

(51) Int. Cl.
*G05B 15/02* (2006.01)
*H04L 12/28* (2006.01)

(52) U.S. Cl.
CPC ...... *H04L 12/2816* (2013.01); *H04L 12/2823* (2013.01); *H04L 2012/285* (2013.01)

(58) Field of Classification Search
CPC ............. H04L 12/2816; H04L 12/2823; H04L 2012/285
See application file for complete search history.

(56) References Cited

U.S. PATENT DOCUMENTS

| | | | |
|---|---|---|---|
| 11,356,434 | B2 | 6/2022 | McCracken |
| 2007/0250191 | A1 | 10/2007 | Rourke et al. |
| 2010/0250707 | A1* | 9/2010 | Dalley ............... G06Q 30/0202 709/219 |
| 2014/0244834 | A1 | 8/2014 | Guedalia et al. |
| 2015/0167995 | A1* | 6/2015 | Fadell ...................... F24F 11/59 700/275 |
| 2018/0115802 | A1 | 4/2018 | Knox |
| 2018/0196865 | A1 | 7/2018 | Rabin et al. |
| 2018/0376313 | A1* | 12/2018 | Horton ................ H04L 12/2816 |
| 2019/0281095 | A1 | 9/2019 | Ein-Gil et al. |
| 2020/0127451 | A1 | 4/2020 | Elberbaum |
| 2020/0364588 | A1 | 11/2020 | Knox |
| 2020/0380968 | A1 | 12/2020 | Hatfield et al. |
| 2020/0394436 | A1 | 12/2020 | Rakshit et al. |
| 2021/0012563 | A1 | 1/2021 | Strugar et al. |
| 2021/0067968 | A1 | 3/2021 | Ragusa et al. |

OTHER PUBLICATIONS

Notice of Allowance dated Feb. 15, 2022, U.S. Appl. No. 17/351,771, filed Jun. 18, 2021.
McCracken Jr., Billy G., "Technical Layer for Portable Electronic Assistant," filed Jun. 18, 2021, U.S. Appl. No. 17/351,771.
FAIPP Pre-Interview Communication Office Action dated Jan. 25, 2021, U.S. Appl. No. 16/874,573, filed May 14, 2020.
Notice of Allowance dated Mar. 23, 2021, U.S. Appl. No. 16/874,573, filed May 14, 2020.
McCracken Jr., Billy G., et al., "Presentation and Technical Layers For Portable Electronic Assistant," filed May 12, 2021, International Application No. PCT/US21/32118.
McCracken Jr., Billy G., et al., "Technical Layer for Portable Electronic Assistant," filed May 14, 2020, U.S. Appl. No. 16/874,573.

* cited by examiner

PRESENTATION LAYER FOR PORTABLE ELECTRONIC ASSISTANT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic assistants provide a variety of convenience features in a home environment. The electronic assistant can be commanded by voice commands from a user to perform a variety of actions on behalf of the user. The electronic assistant can look up answers to questions posed by the user. The electronic assistant can operate controls in the home environment such as turn lights off and on, turn an entertainment device off and on, lock or unlock doors. In some cases the functionality of the electronic assistant may be limited by the capability of devices in the home environment. For example, the electronic assistant may not be able to control devices that do not have a wireless interface.

SUMMARY

In an embodiment, a method of controlling an environment using a roaming electronic assistant is disclosed. The method comprises capturing a plurality of associations of voice commands to device commands coded for a first electronic assistant (EA) device by a home electronic assistant (EA) client application executing on the first EA device, where each association links a voice command to a corresponding device command coded for the first EA device, and where the first EA device takes action in a home environment based on the voice commands. The method further comprises sending the associations of voice commands to device commands coded for the first EA device to a EA server application executing on a computer system, storing the associations of voice commands to device commands coded for the first EA device by the EA server application, and building a mapping of the associations of voice commands for the first EA device to associations of voice commands for a second EA device by the EA server application, where each association of a voice command for the second EA device links a voice command to a device command coded for the second EA device, where the second EA device is different from the first EA device. The method further comprises determining that at least one device command coded for the second EA device is not mapped to a voice command associated to a device command coded for the first EA device, presenting a user interface to a user in a destination location that prompts the user to define a voice command for the at least one device command coded for the second EA device that is not mapped to a voice command associated to a device command coded for the first EA device, and adding at least one association of a voice command to a device command coded for the second EA device to the associations of voice commands for the second EA device based on user input received from the user interface presented in the destination location. The method further comprises sending the associations of voice commands for the second EA device to a roaming EA client application executing on the second EA device, whereby a user visiting a destination location different from the home environment is able to use voice commands used in the home environment to command the second EA device to take actions in the destination environment.

In another embodiment, a roaming electronic assistant system is described. The system comprises a data store, an at least one processor, a non-transitory memory, and an electronic assistant (EA) server application stored in the non-transitory memory. When executed by the at least one processor, the EA server application receives associations of voice commands to device commands coded for a first EA device from a home EA client application executing on the first EA device, wherein the first EA device is located in a home environment, stores the associations of the voice commands to device commands coded for the first EA device in the data store, and analyzes associations of device commands coded for EA devices in home environments different from the home environment associated with the first EA device to device commands coded for a second EA device stored in the data store, where the second EA device is located in a destination environment. The EA server application further builds a mapping of the associations of voice commands for the first EA device to associations of voice commands for the second EA device based on comparing the device commands coded for the first EA device to the device commands coded for EA devices in home environments different from the first EA device and based on the associations of device commands coded for EA devices in home environments different from the home environment of the first EA device to device commands coded for the second EA device, where each association of a voice command for the second EA device links a voice command to a device command coded for the second EA device, stores the associations of voice commands to device commands coded for the second EA device in the data store, and sends the associations of voice commands for the second EA device to a roaming EA client application executing on the second EA device, whereby a user visiting a destination location different from the home environment is able to use voice commands used in the home environment to command the second EA device to take actions in the destination environment.

In yet another embodiment, a method of controlling an environment using a roaming electronic assistant is disclosed. The method comprises, in response to a user traveling to a destination location different from a home location of the user, accessing user preferences in a data store by an electronic assistant (EA) server application executing on a computer, where the user preferences are associated with entertainment preferences and eating preferences. The method further comprises establishing communication by the EA server application with an electronic concierge application associated with the destination location, where the electronic concierge application executes on a computer and sending the user preferences by the EA server application to the electronic concierge application. The method further comprises, in response to the user initializing a destination EA client application executing on an EA device in the destination location, requesting entertainment and eating recommendations by the destination EA client application from the electronic concierge application, where the recommendations are associated with entertainment opportunities and eating opportunities available from the destination location and presenting entertainment and eating recommendations to the user by the EA client application.

In yet another embodiment, a roaming electronic assistant system is disclosed. The system comprises a data store, an at least one processor, a non-transitory memory, and an electronic assistant (EA) server application stored in the non-transitory memory. When executed by the processor, the EA server application, receives associations of voice commands to device commands coded for a first EA device from a home EA client application executing on the first EA device, wherein the first EA device takes action in a home environment based on the voice commands and stores the associations of the voice commands to device commands coded for the first EA device in the data store. The EA server application, when executed by the processor, further builds a mapping of the associations of voice commands for the first EA device to associations of voice commands for a second EA device, where each association of a voice command for the second EA device links a voice command to a device command coded for the second EA device, where the second EA device is different from the first EA device, stores the associations of voice commands to device commands coded for the second EA device in the data store and sends the associations of voice commands for the second EA device to a roaming EA client application executing on the second EA device, whereby a user visiting a destination location different from the home environment is able to use voice commands used in the home environment to command the second EA device to take actions in the destination environment.

In yet another embodiment, a method of controlling an environment using a roaming electronic assistant is disclosed. The method comprises capturing a plurality of associations of voice commands to device commands coded for a first electronic assistant (EA) device by a home electronic assistant (EA) client application executing on the first EA device, where each association links a voice command to a corresponding device command coded for the first EA device, and where the first EA device takes action in a home environment based on the voice commands, sending the associations of voice commands to device commands coded for the first EA device to a EA server application executing on a computer system, and storing the associations of voice commands to device commands coded for the first EA device by the EA server application. The method further comprises building a mapping of the associations of voice commands for the first EA device to associations of voice commands for a second EA device by the EA server application, where each association of a voice command for the second EA device links a voice command to a device command coded for the second EA device, where the second EA device is different from the first EA device and sending the associations of voice commands for the second EA device to a roaming EA client application executing on the second EA device, whereby a user visiting a destination location different from the home environment is able to use voice commands used in the home environment to command the second EA device to take actions in the destination environment.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
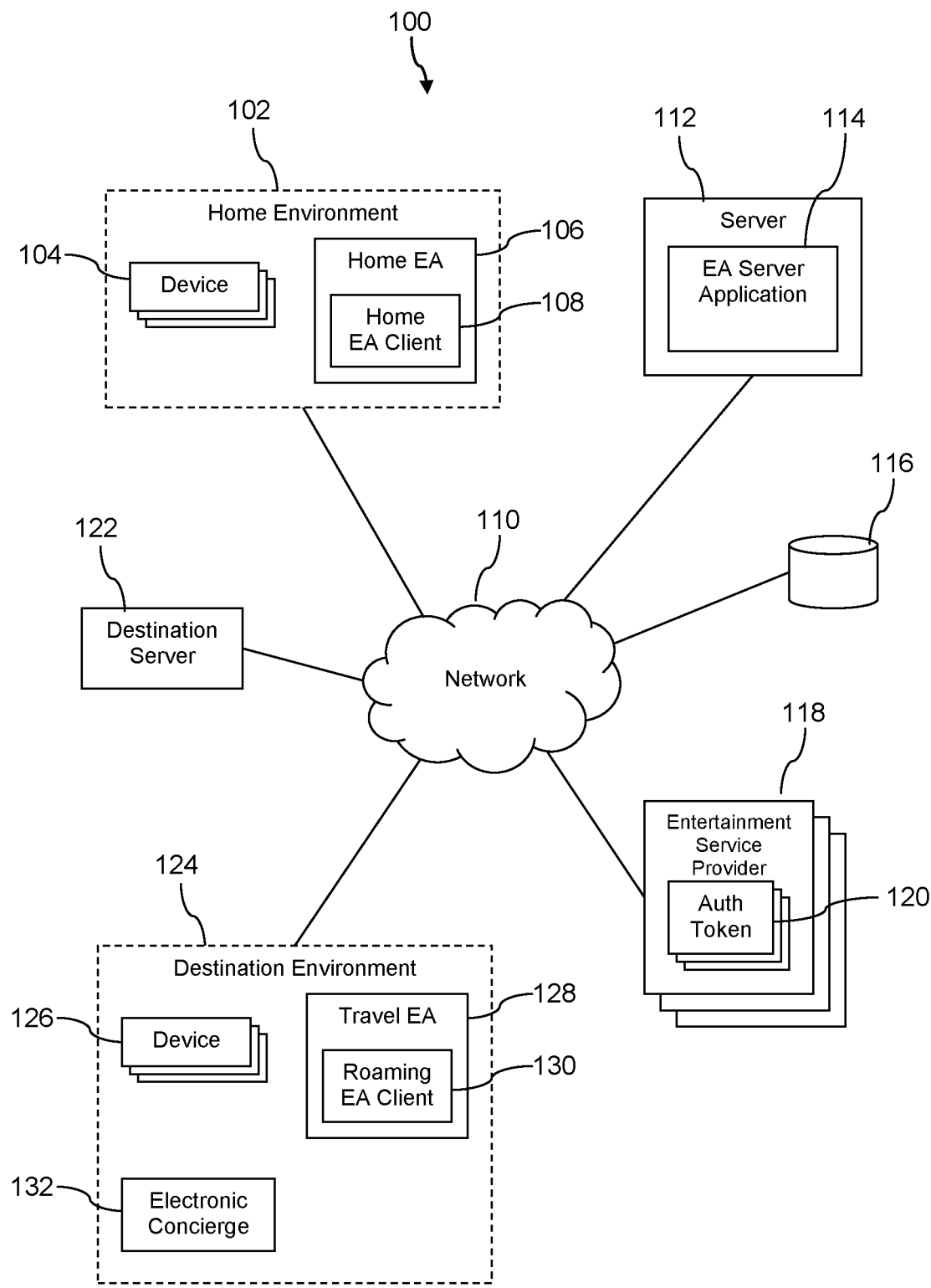
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Electronic assistants provide useful functionality in home environments, but these benefits are not portable to environments outside the home. For example, when a user travels on business and stays overnight in a hotel, the configurations and settings installed in his or her electronic assistant at home are not portable to an electronic assistant that may be present in the hotel room. The voice commands the user is accustomed to using in his or her home, brokered by the electronic home assistant into control inputs to devices in the home environment, are not operable in the hotel. For example, when a user rents a beach house on Kauai, the configurations and settings installed in his or her electronic assistant at home are not portable to an electronic assistant that may be present in the beach house. The voice commands used at home are not operable in this destination environment.

To the contrary, in both these examples, the user may have to spend time configuring the electronic assistant with his or her preferences for various settings of controls in the destination environment (e.g., the hotel room or the beach house), spend time defining his or her authorized entertainment services and authorization credentials used to access those entertainment services, and remember to clear those authorization credentials in some way before leaving the destination. In these examples, the user may need to learn different voice commands to interact with smart devices in the destination environment, for example to turn on and off lights, because of differences between the destination electronic assistant and the electronic assistant in his or her home. The present disclosure teaches a system and method for providing a portable and flexible electronic assistant functionality. In some contexts, this may be referred to as a roaming electronic assistant functionality. The roaming electronic assistant functionality may be delivered as a presentation layer that a user interacts with, where the presentation layer is constructed on top of the technical layer that interacts with smart devices in the environment.

The roaming electronic assistant functionality may be provided by a client application executing in the electronic assistant in the home environment, by an electronic assistant server application executing on a computer system, and roaming clients executing in electronic assistants in destination environments. The electronic assistant server application may be referred to as a ubiquitous electronic assistant (EA) application in some contexts. A technical layer of the EA server application may interrogate the home client application to learn a user's preferred settings in the home environment. The technical layer of the EA server application may interrogate the home client application to learn a user's entertainment service authorizations (e.g., a list of distinctive or premium entertainment services) and authorization credentials for those services. The technical layer of the EA server application may store these in a data store. The technical layer of the EA server application may determine that the user will be visiting a destination location that has an EA and may query the destination EA to learn application programming interfaces (APIs) of that destination EA and APIs of controls of smart devices in the destination environment, whereby to know how to map user preferences and commands in the home environment to the destination environment. The technical layer of the EA server application may learn that some of the smart controls in the destination environment are a salon light in a hotel room, an entrance light in the hotel room, an over-the-desk light in the hotel room, and a bedside light in the hotel room. The technical layer of the EA server application may map user temperature setting preferences in the home environment to temperature setting preferences in the destination environment and configure the destination EA with the user temperature preferences. For further details of the technical layer of the EA server application see U.S. patent application Ser. No. 16/874,573 filed May 14, 2020 entitled "Technical Layer for Portable Electronic Assistant," by Billy G. McCracken, Junior, which is incorporated herein by reference in its entirety.

The presentation layer portion of the roaming electronic assistant captures associations of voice commands to device commands coded for the home environment and sends those associations to a presentation layer portion of the EA server application. The EA server application may store the associations of voice commands to device commands coded for the home environment in a data store. As used herein, the expression "device command coded for" refers to an API associated with a device in a given environment, for example in a home environment, in a destination environment, in a public environment, in an office building environment. The expression "device command coded for" may refer to an API that is known to and invoked by an EA, for example invoked by an EA located in a home environment to actuate and/or command a device (light switch, door lock, HVAC controller, entertainment device).

The EA server application may then map those associations to corresponding associations of the same voice commands to like device commands applicable to the destination environment. For example, a "spotlight off" voice command that is acted upon by the EA in the home environment by turning off a spotlight over a living room fireplace may be mapped by the EA server application to cause the EA in a destination location to turn off an ambient light in a salon area in the destination location. For example, a "turn on the living room lights" voice command that is acted upon by the EA in the home environment by turning on the living room lights may be mapped by the EA server application to cause the EA in the destination location to turn on suite lights in the destination location.

In an embodiment, the EA server application may attempt to match device commands coded for the user's home environment to like device commands coded for a different user's home environment. For example, the EA server application may work with other EA client applications in home environments of other users and may store mappings of device commands coded for a different user's home environment to device commands coded for a variety of different destination environments. If the EA server application can match Bob's device command X coded for Bob's home environment to Joe's device command Y coded for Joe's home environment, and if the EA server application has already associated Joe's device command Y coded for Joe's home environment to a device command Z coded for the subject destination environment, then the EA server application can associate Bob's voice command associated with Bob's device command X coded for Bob's home environment to the device command Z coded for the subject destination environment. This technique of associating device commands coded to a home environment to device commands coded for a destination environment may be used in combination with the method described further above or may be used when the method described above is unable to complete a mapping of a command code.

The presentation layer may learn of device commands, device controls, or device APIs available in the destination location from the technical layer. The presentation layer may attempt to map the device controls available in the destination location to like device controls available in the home environment. For example, the presentation layer may obtain a layout of the destination (e.g., a plan or map of a hotel room) that identifies device controls in the destination environment and may associate the controls in the home environment to the controls in the destination environment based on names of the respective controls. The presentation layer may compare this layout of the destination to a layout of the home environment (e.g., a plan or map of the home) and map device controls in the destination environment to device controls in the home environment based on the similarity of layout portions—for example similarity of uses or functions of corresponding portions of the different locations. The presentation layer may determine a living room of a home environment corresponds to a salon area of a hotel room. The presentation layer may determine a master bedroom of a home environment corresponds to a bed area of a hotel room. The presentation layer may analyze the layout of the destination to determine what devices are located where: a first lamp is in a salon area, a second lamp is in a bedside area, a third lamp is in an entrance area. The presentation layer may then use the types and numbers of objects in areas of the destination environment compared to types and numbers of objects in areas of the home environment to determine what areas of the destination environment correspond to what areas of the home environment.

The presentation layer may make these layout associations in part based on a history or previous successful mappings of home layout to destination layouts. The presentation layer may make these layout associations in part based on a history of previous successful mappings between home layouts of different users to the layout of the same destination environment. The presentation layer may obtain histories of associations of devices in home environments to other destination environments, for example from a data store, and may use this historical information to infer matches between this specific user's device controls in his or her home environment to device controls in the subject destination environment. These histories may be derived from that specific user or additionally from histories associated with different and unrelated users. When this succeeds, the presentation layer can map the voice commands associated with the device controls in the home environment to the corresponding device controls in the destination environment.

The presentation layer can rely on a geometry match, a tool match, a word match, and a history match to define these mappings. For example, the AI layer may obtain a geometry of the hotel room (a room layout map) from the hotel and compare this to other geometries it has analyzed to determine what devices are located where: a first lamp is in a salon area, a second lamp in in a bedside area, a third lamp is in an entrance area. The AI layer can analyze history of tools—smart devices that may be commanded wirelessly—from other environments including a home environment of the user to understand what these devices are and to match user preferred commands for controlling those devices in the home environment to the roaming hotel room environment. The history matching can employ history of both the user and also history of other unrelated users. What have other users designated the devices in the hotel room in the past?

When this direct mapping attempt fails, the presentation layer may present an interface to a user in the destination environment that prompts the user to identify a voice command for the presentation layer to use to control the subject device control. The interface may be presented on a screen in the destination environment, for example a television screen in a hotel room. The interface may be presented on the display of the user's mobile communication device or mobile phone. The interface may prompt the user to speak the appropriate or desired voice command to associate to the subject device control and/or device command. The interface may capture the audio of the voice command and store this in association with the subject device control and/or device command. In an embodiment, the user may be prompted to repeat the voice command several times whereby to obtain an averaged kind of voice command recording.

The presentation layer may respond to voice commands of the user to control the temperature of the destination environment. For example, the user may command "activate sleeping temperature," and the presentation layer may command the technical layer to set the destination environment HVAC controls to regulate temperatures to the user's preferred sleeping temperature range, for example setting the room to 68 degrees. For example, the user may command "activate wake-up temperature," and the presentation layer may command the technical layer to set the destination environment HVAC controls to regulate temperature in the bathroom to the user's preferred showering temperature, for example setting bathroom to 74 degrees. For example, the user may command "activate daytime temperature," and the presentation layer may command the technical layer to set the destination environment HVAC controls to regulate temperature in the destination environment to maintain temperature at 70 degrees. The user may command "lock doors," and the presentation layer may command the technical layer lock each of the doors in the location.

The presentation layer portion of the roaming electronic assistant may also capture user preferences in entertainment and preferences in eating. These preferences may be gleaned by the EA client application in the home environment and/or by the EA client application (roaming client) executing in a destination environment. The EA client application may monitor user selections of entertainment—preferred television programs, preferred sports programs, and preferred music. The EA client application may monitor user selections of food, such as by monitoring carry out orders, by monitoring user requests to look-up a phone number of restaurants, by monitoring user requests for a list of local Italian restaurants or local German restaurants. The EA client applications can send messages to the EA server application indicating user preference information, and the EA server application can store these messages about user preferences in the data store.

The EA server application may forward user entertainment and eating preferences to an electronic concierge device or application at the destination environment, for example at a hotel destination. When the user interacts with the EA client application in the destination environment (the roaming EA), the user may request restaurant recommendations. The EA client application in the destination environment may request the electronic concierge serving the destination environment for restaurant recommendations, and the electronic concierge may generate restaurant recommendations for the EA client application in the destination environment to present to the user based on the user's eating and/or food preferences based on the user preferences received from the EA server application and based on information on local restaurants obtained by the electronic concierge. The recommendations may be generated based on specific parameters provided by the user, for example, a restaurant within walking distance, a restaurant within 15 minutes driving distance, a table for 8, or other parameters. The electronic assistant can generate the recommendations based on things such as operating hours of the local restaurant, the current date and time, and driving distance to the restaurant. When the user asks the EA client application in the destination environment to turn on the TV, the EA client application may ask the electronic concierge serving the destination environment for a TV program available in the destination (e.g., in the hotel room given the cable package active for that hotel room) that best suits the user's entertainment preferences. The EA client application may then turn on the TV and tune it to the recommended channel.

Turning now to FIG. 1, a communication system 100 is described. In an embodiment, the system 100 comprises a home environment 102 comprising a plurality of devices 104 and a home electronic assistant (EA) 106 that comprises and/or executes a home EA client application 108. In some contexts, the home EA 106 may be referred to as a home electronic assistant appliance. The home EA 106 may be implemented as a computer. Computers are described further hereinafter. The devices 104 comprise smart devices in the home environment 102, for example light switches, door locks, heating ventilation and air conditioning (HVAC) controllers, and appliances that communicate with the home EA 106 via wireless communication links. The devices 104 may comprise one or more entertainment devices, for example a flat-screen television, a set-top box, a multi-application controller that communicate with the home EA 106 via wireless communication links or via wired communication links. A user may use the home EA 106 to control one or more of the devices 104. The user may use the home EA 106 to control devices 104 using natural language voice commands that are received by a microphone in the home EA 106, transcoded by the home EA 106 to digital commands and application programming interface (API) messages distinctive to the devices 104, and transmit API messages to the devices 104 via a wireless communication link or a wired communication link from the home EA 106 to the devices 104. The home EA 106 may be communicatively coupled to a network 110. The network 110 comprises one or more private networks, one or more public networks, and/or a combination thereof. The user may command the home EA 106 with natural language voice commands to look-up information via a communication link via the home EA 106 and via the network 110, for example to a web application executing on a server communicatively coupled to the network 110.

The home EA 106 may learn user preferences for configurations of the devices 104, for example preferred temperature settings for a HVAC controller. The home EA 106 may learn identities of distinctive entertainment services that are supported by one or more devices 104 (e.g., entertainment devices) as well as authorization credentials for the entertainment services. The entertainment services may comprise a streaming video service that a user may subscribe to. The entertainment services may comprise a streaming audio service that a user may subscribe to. The entertainment services may comprise a movie rental service that a user may pay on a pay-per-use or temporary rental basis. The entertainment services may comprise a premium content access service, for example specialized sports content, specialized stock and financial content.

The entertainment service authorization credentials may be a user identity and a password or a phone number and a password or some other set of entertainment service authorization credentials. The home EA 106 may learn the user preferences and entertainment service authentication credentials from the user and then store them, whereby to act on user voice commands. For example, when voice commanded to start a streaming video application on a device 104 (e.g., a network connected television), the home EA 106 may establish communication with an entertainment service provider and provide the authorization credentials associated with that distinctive entertainment service. The entertainment service may then stream video to the device 104 associated with the distinctive entertainment service. The home EA 106 may learn user preferences for entertainment choices and user preferences for eating.

The entertainment choices may be preferred types of entertainment—a preference for news over comedy, a preference for sports over documentaries. The entertainment choices may be associated with times. The entertainment preference at 5 PM to 7 PM might be news, the entertainment preference from 7 PM to 9 PM might be sports, and the entertainment preference after 9 PM may be comedy. Eating preferences may be types of food, for example Italian food, German food, or Thai food. The home EA client application 108 may glean the user entertainment preferences and food preferences from user interactions with the home EA 106, for example a pattern of TV viewing gleaned from user commands to tune to TV programs, a pattern of music listening gleaned from user commands to play music, a pattern of user commands to dial a restaurant to make reservations or to order carry-out. The home EA client application 108 may send a report to the EA server application 114 identifying one or more user preference, and the EA server application 114 may store the one or more user preference in the data store 116. The home EA client application 108 may prompt a user to input information defining one or more user preference; the home EA client application 108 may transmit a report identifying the one or more user preference input by the user in response to prompting to the EA server application 114; and the EA server application 114 may store the one or more user preference in the data store 116.

The home EA client application 108 may capture the user preferences for configurations of devices 104 and/or entertainment service authorization credentials and send them to an EA server application 114 that executes on a computer system 112. The home EA client application 108 may send the user preferences for entertainment choices and for eating to the EA server application 114. The EA server application 114 may store the user preferences and/or entertainment service authorization credentials in a data store 116. The home EA client 108 may further identify voice commands used by a user to command devices 104 and send mappings of commands to device controls and/or device APIs to the EA server application 114.

While FIG. 1 shows a single home environment and a single home EA 106, it is understood that the system 100 may comprise any number of different home environments 102, each having its own home EA 106, and that the EA server application 114 may interact with all of the home EA clients 108 in similar manners. In an embodiment, each home environment 102 may be associated with different users. For example, a first home environment 102 may be associated with a first one or more users; a second home environment 102 may be associated with a second one or more users; and a third home environment 102 may be associated with a third one or more users. Users may correspond to members of households, where any given household may comprise one or more users. The EA server application 114 may be referred to in some contexts as simply the EA server application or as simply the EA server application. The EA server application 114 may analyze the settings of a plurality of different home EAs 106 of different home environments 102 to identify patterns and mappings of commands to devices.

The user may travel to different destination environments 124 in connection with business operations away from a home office, with family obligations, and/or with pleasure travel. The destination environment 124 may comprise a hotel room, a rented beach house, a rented ski cottage, an air bed-and-breakfast (air BNB), or a house belonging to a sibling or in-law of the user. The destination environment 124 may be a private house different from the home of the user. The destination environment 124 may be referred to as the destination location in some contexts.

Desirably the user may enjoy the convenience and service of his or her home EA 106 while traveling, but the current paradigm does not support that. To the contrary, the user may have to adapt himself or herself to the idiosyncrasies of a different brand of electronic assistant in the destination environment 124 and possibly reconfigure the electronic assistant in the destination environment 124 to his or her preferences. Often a user may forego use of the electronic assistant in such a destination environment from lack of patience and/or time.

In an embodiment, the destination environment 124 comprises a plurality of devices 126 and a travel EA 128 that executes a roaming EA client application 130. The travel EA 128 may be referred to as a travel electronic assistant appliance in some contexts. The travel EA 128 may be implemented as a computer. The devices 126 comprise smart devices in the destination environment 124 and may be HVAC controls, light switches, and appliances. The devices 126 may comprise one or more entertainment devices for example a television. The devices 126 may communicate with the travel EA 128 via wireless communication links or via wired communication links. The user may use the travel EA 128 to control the devices 104. The roaming EA client application 130 may communicate with the EA server application 114 and learn many of the preferences of the user in the home environment 102 and apply the user's preferences from the home environment 102 to the destination environment 124 via the travel EA 128. Said in other words, the roaming EA client application 130 provides the user with the experience of a roaming EA functionality: the opportunity to interact with the travel EA 128 substantially as he or she would interact with the home EA 106.

The EA server application 114 may learn of the devices 126 in the destination environment 124 in advance of the user arriving at the destination environment 124. The EA server application 114 may have access to a travel itinerary of the user and know when the user will be arriving at the destination environment 124. The EA server application 114 may have access to the location of a wireless communication device belonging to the user and may associate that location with the destination environment 124. The EA server application 114 may interwork with a destination server 122 that is associated with the destination environment 124 and/or with the travel EA 128. For example the destination server 122 may be associated with a hotel chain that owns the destination environment 124 (e.g., a hotel room), or with a rental agency that owns the destination environment 124 (e.g., a rented beach house or ski cottage), or with a service. The EA server application 114 may learn the identities and APIs of devices 126 present in the destination environment 124. The EA server application 114 may analyze the information about the devices 126 to map them to the devices 104 in the home environment 102 and to map user voice commands used in the home environment 102 to appropriate commands for use in the destination environment 124.

The EA server application 114 may determine that the user is at the destination environment 124 based on an indication of location provided by a wireless communication device of the user, for example a smart phone. The EA server application 114 may determine that the user is at the destination environment 124 based on a confirmation or check-in read from the destination server 122. The EA server application 114, upon arrival of the user at the destination environment 124, may send the user environment setting preferences to one or more devices 126 in the destination environment 124 (for example, the EA server application 114 transmits the user environment setting preferences to the roaming EA client application 130, and the roaming EA client application 130 transmits these environment setting preferences via the travel EA 128 to the HVAC controller via a wireless communication link).

The EA server application 114 may generate an authorization token based on the user entertainment authorization credentials, whereby to protect the actual credentials. The EA server application 114 may provide the authorization token and the matching authorization credentials of the user to an entertainment service provider 118 which stores an association of the authorization tokens 120 and the user authorization credentials. The EA server application 114 may provide the authorization token to the roaming EA client 130. The roaming EA client 130 may configure a device 126 in the destination environment 124 with the authorization token. The device 126 may then present the authorization token to the entertainment service provider 118 when attempting to access the entertainment service. The entertainment service provider 118 may look up the user authorization credentials based on the presented authorization token 120, verify that the user authorization credentials are valid, and provide the requested access to entertainment service to the requesting device 126.

The authorization token 120 can be destroyed and/or the association between the authorization token 120 and the user authorization credentials can be destroyed after the user leaves the destination environment 124. The EA server application 114 may send an association cancellation to the entertainment service provider 118 instructing that the association between the user authorization credentials and the authorization token 120 be canceled or erased. Alternatively, in an embodiment, the EA server application 114 builds a time-to-live value into the authorization token 120, and the entertainment service provider 118 examines the time-to-live value in an authorization token 120 presented by a device 126 in the destination environment 124. If the time-to-live value is valid, the entertainment service provider 118 provides access to the entertainment service to the devices 126. If the time-to-live value is expired, the entertainment service provider 118 denies the requested access to the entertainment service.

As pointed out above, the EA server application 114 interacts with a plurality of different home environments 102 and different home EA client applications 108. Likewise, the EA server application 114 interacts with a plurality of different destination environments 124. The EA server application 114 is able to leverage information learned from a first home EA client application 108 for use with a second home EA client application 108. For example, while different models and brands of home EAs 106 may have different APIs, there are a limited number of different models and brands of home EAs 106, and once the EA server application 114 has learned the APIs of one instance of an EA model and brand it can leverage this knowledge of its APIs with other instances of the same EA model and brand. In the same way, the EA server application 114 is able to leverage information learned from a first roaming EA client application 130 executing in a first travel EA 128 for use with a second roaming EA client application 130 executing in a second travel EA 128 of the same model and brand.

The EA server application 114 may leverage its mappings of user voice commands in the home environment 102 and with the home EA 106 to a first destination environment 124 and a first travel EA 128 in determining mappings of these same user commands in the home environment 102 and with the home EA 106 to a second destination environment 124 and a second travel EA 128. For example, over time, the user may visit multiple different destination environments 124 and the EA server application 114 may progressively learn how to map voice commands employed in the home environment 102 to use for controlling more devices 126 in different destination environments 124. It may be that a voice command mapping for a device 126 developed for a first destination environment 124 may provide leverage for mapping a voice command to a different but similar device 126 in a second destination environment 124 that otherwise the EA server application 114 could not have mapped. Additionally, the EA server application 114 may use mappings made in association with a first user to assist in developing voice command mappings for a second unrelated user.

The destination environment 124 may comprise an electronic concierge 132. The electronic concierge 132 may be located on the premises of the destination environment 124, such as at a hotel. Alternatively, the electronic concierge 132 may be located off the premises of the destination environment 124 and may be provided as a service to the destination environment. For example, the destination environment 124 may be a rental beach house, and the electronic concierge 132 may not physically be located in the beach house but instead on the premises of a rental agency or may be delivered as software-as-a-service (SAS) by a cloud computing application. The electronic concierge 132 may respond to requests from the roaming EA client 130 for recommendations for the user, for example for recommendations for tuning the TV or recommendations for restaurants. The roaming EA client 130 may provide restaurant recommendations pro-actively, that is without the user requesting a reservation. For example, the roaming EA client 130 may prompt the user that a good Italian restaurant is nearby but that reservations typically are required and are filled up rather early in the day—would the user like the roaming EA client 130 to place a call for the user to complete a reservation?

In an embodiment, the roaming EA client application 130 may glean user preferences in entertainment and eating; the roaming EA client application 130 may generate a user preference report documenting those user preferences; the roaming EA application 130 may transmit the report including the user preferences to the EA server application 114; and the EA server application 114 may store the reported user preferences in the data store 116. In an embodiment, the roaming EA client application 130 may prompt the user to input user preferences in entertainment and eating; the roaming EA client application 130 may generate a user preference report documenting those user preferences input by the user; the roaming EA application 130 may transmit the report including the user preferences to the EA server application 114; and the EA server application 114 may store the reported user preferences in the data store 116.

Figure 2A:
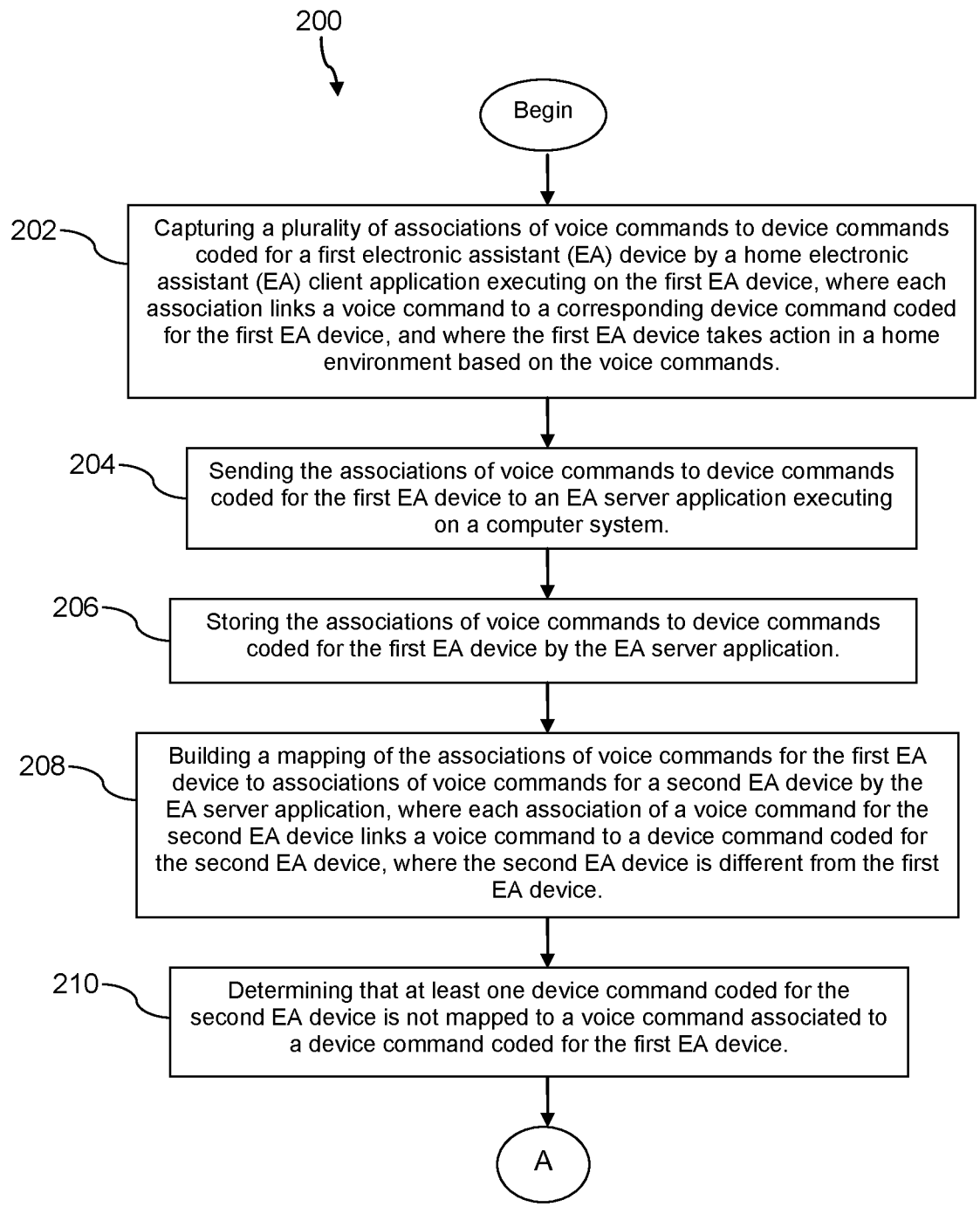
FIG. 2A and FIG. 2B are a flow chart of a method according to an embodiment of the disclosure.
Figure 2B:
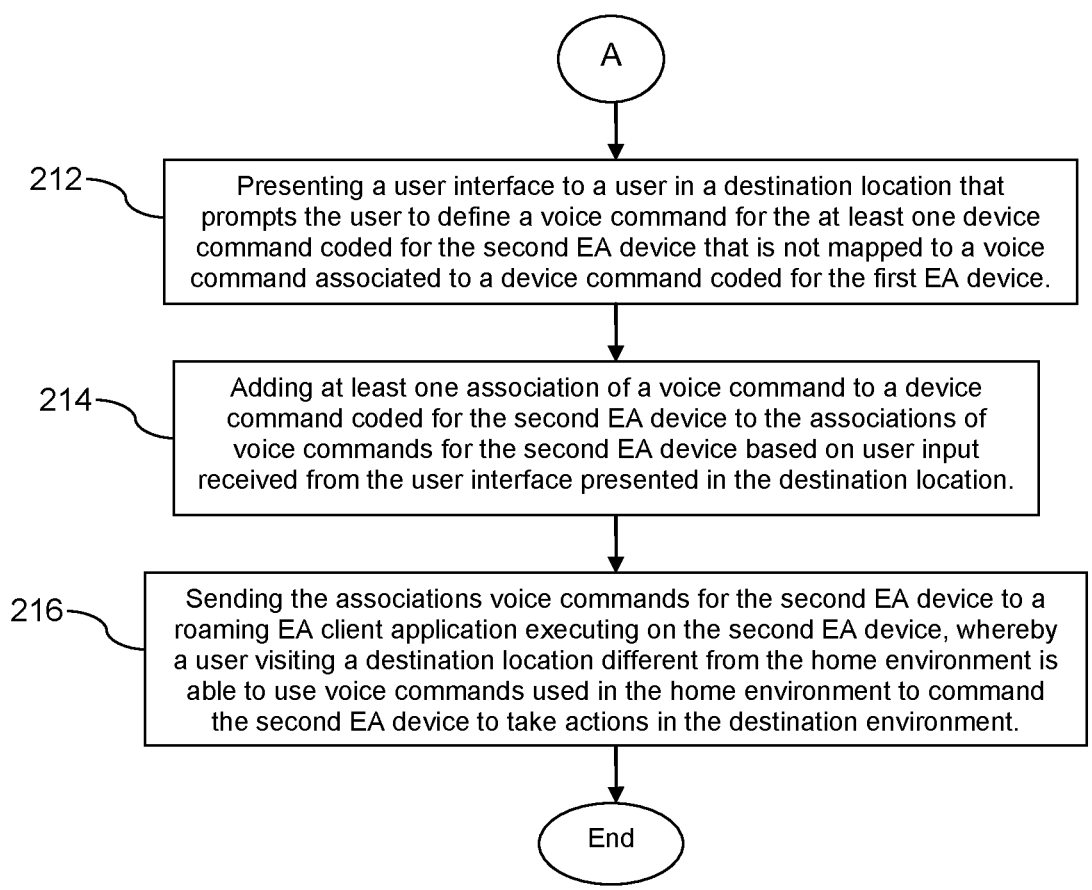

Turning now to FIG. 2A and FIG. 2B, a method 200 is described. In an embodiment, the method 200 is a method of controlling an environment using a roaming electronic assistant. At block 202, the method 200 comprises capturing a plurality of associations of voice commands to device commands coded for a first electronic assistant (EA) device by a home electronic assistant (EA) client application executing on the first EA device, where each association links a voice command to a corresponding device command coded for the first EA device, and where the first EA device takes action in a home environment based on the voice commands. In an embodiment, the device commands coded for the first EA device comprise a command for a light switch, a command for a door lock, a command for a heating ventilation and air conditioning (HVAC) controller, or a command for an entertainment device. When the user utters a voice command in the home environment, the first EA device looks up the association of the voice command to the device command coded for the first EA device, and then the first EA device invokes that device command, for example invokes an application programming interface (API) of the device (the light switch, the door lock, the HVAC controller, the entertainment device).

At block 204, the method 200 comprises sending the associations of voice commands to device commands coded for the first EA device to an EA server application executing on a computer system. At block 206, the method 200 comprises storing the associations of voice commands to device commands coded for the first EA device by the EA server application, for example the EA server application 114 stores the associations of voice commands to device commands coded for the home EA device 106 in the data store 116.

At block 208, the method 200 comprises building a mapping of the associations of voice commands to device commands coded for the first EA device to associations of the same voice commands to device commands coded for a second EA device by the EA server application, where each association of a voice command for the second EA device links a voice command to a device command coded for the second EA device, where the second EA device is different from the first EA device. For example, an association of the voice command "spotlight off" to an API method that turns off a spotlight over a fireplace in the home environment may be mapped to an association of the same voice command "spotlight off" to an API method that turns off an ambient light in a salon area of a hotel room in the destination environment.

Building the mapping may comprise comparing APIs of devices associated with the home environment and APIs of devices associated with the destination environment. For example, the EA client application may compare APIs of devices in the home environment versus APIs of devices in the destination environment to identify similarities of APIs and/or names of the devices. When the EA server application deems an API of a device in the home environment is like an API of a device in the destination environment, it may associate the voice command used to command the device in the home environment to command the device in the destination environment. Said in other words, the EA server application may make inferences that devices in the home environment are like or similar to devices in the destination environment based on their respective APIs and then associate the same voice command to the device in the destination environment (e.g., to the device command coded for the subject device located in the destination environment).

In an embodiment, building the mapping comprises analyzing a history of mapping of associations of voice commands to device commands coded for the first EA device to associations of voice commands to device commands coded for other EA devices different from the second EA device. For example, the EA server application may leverage histories of earlier mappings of associations of voice commands (e.g., for the same user or subscriber) to device commands coded for the home environment to associations of the same voice commands to device commands coded for other destinations or other EAs different from the second EA when building the mapping of associations of block 208.

Building the mapping may further comprise analyzing histories of mapping of associations of voice commands to device commands coded for other EA devices in other home environments to associations of voice commands to device commands coded for the second EA device. For example, mappings of associations of voice commands of other users or subscribers to device commands coded for EA devices in their own home environments to associations of those voice commands of those other users or subscribers to device commands coded for the second EA device in the destination environment may be leveraged to build the mapping of block 208 for the subject user or subscriber associated with method 200.

Building the mapping may further comprise analyzing histories of mapping of associations of voice commands to device commands coded for other EA devices in other home environments to associations of voice commands to device commands coded for other devices different from the second EA device. In other words, building the associations of voice commands to device commands coded for the second EA device of block 208 for the subject user of subscriber associated with method 200 may be based on mappings of associations of voice commands of other users to device commands coded for an EA in their own home environment to associations of voice commands of those users for to device commands coded for other destinations different from the destination environment in which the second EA device is located.

At block 210, the method 200 comprises determining that at least one device command coded for the second EA device is not mapped to a voice command associated to a device command coded for the first EA device. At block 212, the method 200 comprises presenting a user interface to a user in a destination location that prompts the user to define a voice command for the at least one device command coded for the second EA device that is not mapped to a voice command to a device command coded for the first EA device. At block 214, the method 200 comprises adding at least one association of a voice command to a device command coded for the second EA device to the associations of voice commands for the second EA device based on user input received from the user interface presented in the destination location. At block 216, the method 200 comprises sending the associations of voice commands for the second EA device to a roaming EA client application executing on the second EA device, whereby a user visiting a destination location different from the home environment is able to use voice commands used in the home environment to command the second EA device to take actions in the destination environment. In an embodiment, the destination environment is associated with a hotel room, a rented location, or a residence different from the home environment.

Figure 3:
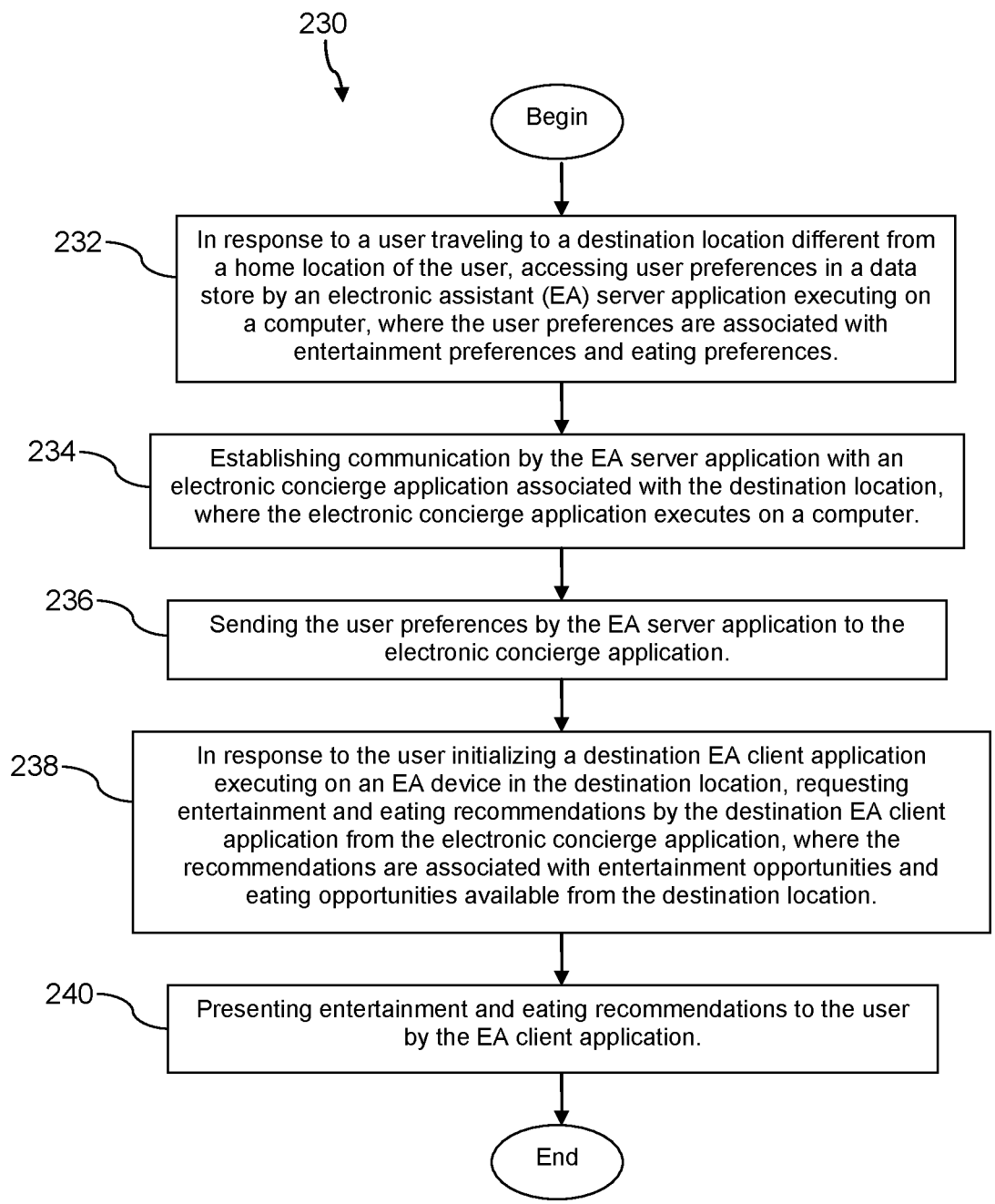
FIG. 3 is a flow chart of another method according to an embodiment of the disclosure.

Turning now to FIG. 3, a method 230 is described. In an embodiment, the method 230 is a method of controlling an environment using a roaming electronic assistant. At block 232, the method 230 comprises, in response to a user traveling to a destination location different from a home location of the user, accessing user preferences in a data store by an electronic assistant (EA) server application executing on a computer, where the user preferences are associated with entertainment preferences and eating preferences.

At block 234, the method 230 comprises establishing communication by the EA server application with an electronic concierge application associated with the destination location, where the electronic concierge application executes on a computer. At block 236, the method 230 comprises sending the user preferences by the EA server application to the electronic concierge application.

At block 238, the method 230 comprises, in response to the user initializing a destination EA client application executing on an EA device in the destination location, requesting entertainment and eating recommendations by the destination EA client application from the electronic concierge application, where the recommendations are associated with entertainment opportunities and eating opportunities available from the destination location. At block 240, the method 230 comprises presenting entertainment and eating recommendations to the user by the EA client application.

In an embodiment, the method 230 comprises receiving a report identifying a user preference by the EA server application from a home EA client application and storing the user preference in the data store by the EA server application, wherein the home EA learns the user preference by monitoring user activities. In an embodiment, the method 230 comprises receiving a report identifying a user preference by the EA server application from a home EA client application and storing the user preference in the data store by the EA server application, wherein the home EA client application learns the user preference by prompting a user to input information defining the user preference.

In an embodiment, the method 230 comprises receiving a report identifying a user preference by the EA server application from an out-of-home EA client application and storing the user preference in the data store by the EA server application, wherein the out-of-home EA client learns the user preference by monitoring user activities. In an embodiment, the method 230 comprises receiving a report identifying a user preference by the EA server application from an out-of-home EA client application and storing the user preference in the data store by the EA server application, wherein the out-of-home EA client learns the user preference by prompting a user to input information defining the user preference.

Figure 4:
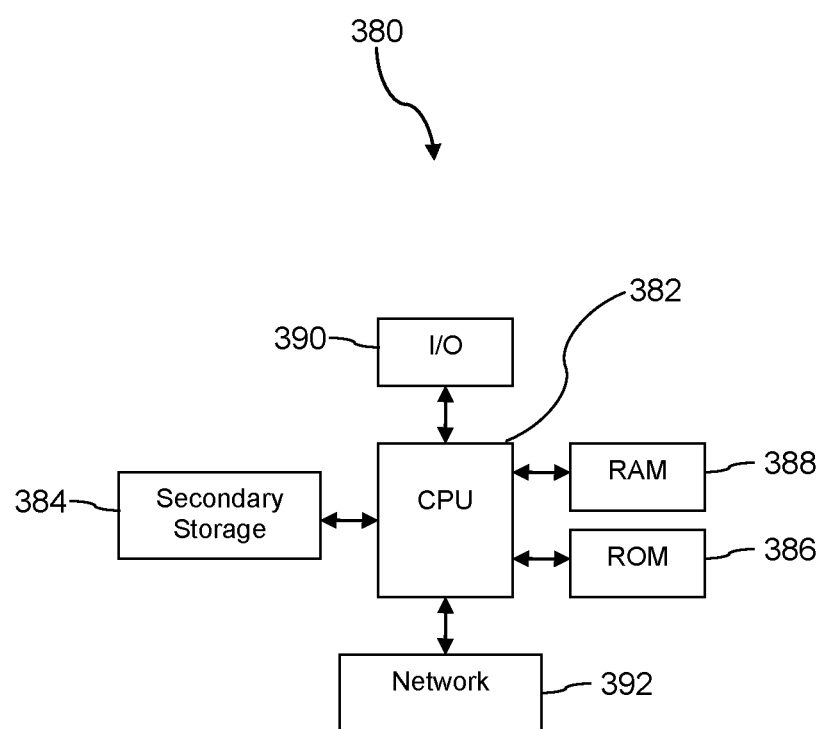
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of controlling an environment using a roaming electronic assistant, comprising:

capturing a plurality of associations of voice commands to device commands coded for a first electronic assistant (EA) device by a home electronic assistant (EA) client application executing on the first EA device, where each association links a voice command to a corresponding device command coded for the first EA device, and where the first EA device takes action in a home environment based on the voice commands;

sending the associations of voice commands to device commands coded for the first EA device by the EA client application to an EA server application executing on a computer system;

storing the associations of voice commands to device commands coded for the first EA device by the EA server application;

building a mapping of the associations of voice commands for the first EA device to associations of voice commands for a second EA device in a destination environment by the EA server application by comparing application programming interfaces (APIs) of devices associated with the home environment and APIs of devices associated with the destination environment, where each association of a voice command for the second EA device links a voice command to a device command coded for the second EA device such that a same voice command spoken by a user in the home environment to control a first device by the first EA device is usable when spoken by the user in the destination environment to control a second different device by the second EA device, where the second EA device is different from the first EA device;

determining that at least one device command coded for the second EA device is not mapped to any voice command associated to a device command coded for the first EA device;

in response to the determining, presenting a user interface to a user in the destination environment that prompts the user to provide a user defined voice command for the at least one device command coded for the second EA device that is not mapped to any voice command associated to a device command coded for the first EA device;

adding at least one association of [[a]] the user defined voice command to a device command coded for the second EA device to the associations of voice commands for the second EA device based on user input received from the user interface presented in the destination environment; and sending the associations of voice commands for the second EA device to a roaming EA client application executing on the second EA device, whereby a user visiting the destination location environment different from the home environment is able to use voice commands used in the home environment to command the second EA device to take actions in the destination environment.

2. The method of claim 1, wherein the device commands coded for the first EA device comprise a command for a light switch, a command for a door lock, a command for a heating ventilation and air conditioning (HVAC) controller, or a command for an entertainment device.

3. The method of claim 1, wherein the destination environment is associated with a hotel room, a rented location, or a residence different from the home environment.

4. The method of claim 1, wherein building the mapping comprises analyzing a history of mapping of associations of voice commands for the first EA device to associations of voice commands for other EA devices different from the second EA device.

5. The method of claim 4, wherein building the mapping comprises analyzing histories of mapping of associations of voice commands for other EA devices in other home environments to associations of voice commands for the second EA device.

6. The method of claim 5, wherein building the mapping comprises analyzing histories of mapping of associations of voice commands for other EA devices in other home environments to associations of voice commands for other devices different from the second EA device.

7. A roaming electronic assistant system, comprising:
a data store;
an at least one processor;
a non-transitory memory; and
an electronic assistant (EA) server application stored in the non-transitory memory that, when executed by the processor:
  receives associations of voice commands to device commands coded for a first EA device from a home EA client application executing on the first EA device, wherein the first EA device is located in a home environment,
  stores the associations of the voice commands to device commands coded for the first EA device in the data store,
  analyzes associations of device commands coded for EA devices in home environments different from the home environment associated with the first EA device to device commands coded for a second EA device stored in the data store, where the second EA device is located in a destination environment,
  builds a mapping of the associations of voice commands for the first EA device to associations of voice commands for the second EA device based on comparing the device commands coded for the first EA device to the device commands coded for EA devices in home environments different from the first EA device and based on the associations of device commands coded for EA devices in home environments different from the home environment of the first EA device to device commands coded for the second EA device, where each association of a voice command for the second EA device links a voice command to a device command coded for the second EA device such that a same voice command spoken by a user in the home environment to control a first device by the first EA device is usable when spoken by the user in the destination environment to control a second different device by the second EA device, and wherein building the mapping comprises comparing application programming interfaces (APIs) of devices associated with the home environment and APIs of devices associated with the destination environment,
  stores the associations of voice commands to device commands coded for the second EA device in the data store, and
  sends the associations of voice commands for the second EA device to a roaming EA client application executing on the second EA device, whereby a user visiting the destination environment different from the home environment is able to use voice commands used in the home environment to command the second EA device to take actions in the destination environment.

8. The system of claim 7, wherein the device commands coded for the first EA device comprise a command for a light switch, a command for a door lock, a command for a heating ventilation and air conditioning (HVAC) controller, or a command for an entertainment device.

9. The system of claim 7, wherein the destination environment is associated with a hotel room, a rented location, or a residence different from the home environment.

10. The system of claim 7, wherein building the mapping comprises analyzing a history of mapping of associations of voice commands for the first EA device to associations of voice commands for other EA devices different from the second EA device.

11. The system of claim 7, further comprising:
  determining that at least one device command coded for the second EA device is not mapped to a voice command associated to a device command coded for the first EA device;
  presenting a user interface to a user in the destination environment that prompts the user to define a voice command for the at least one device command coded for the second EA device that is not mapped to a voice command associated to a device command coded for the first EA device; and
  adding at least one association of a voice command to a device command coded for the second EA device to the associations of voice commands for the second EA device based on user input received from the user interface presented in the destination location environment.

12. The method of claim 1 further comprising:
  in response to the user traveling to the destination environment different from the home environment of the user, accessing user preferences in a data store by the electronic assistant (EA) server application, where the user preferences are associated with entertainment preferences and eating preferences;
  establishing communication by the EA server application with an electronic concierge application associated with the destination environment, where the electronic concierge application executes on a computer;
  sending the user preferences by the EA server application to the electronic concierge application;
  in response to the user initializing the roaming EA client application executing on the second EA device in the destination environment, requesting entertainment and eating recommendations by the roaming EA client application from the electronic concierge application, where the recommendations are associated with entertainment opportunities and eating opportunities available from the environment location; and
  presenting entertainment and eating recommendations to the user by the roaming EA client application.

13. The method of claim 12, wherein the destination environment is associated with a hotel room, a rented location, or a residence different from the home location.

14. The method of claim 12, further comprising receiving a report identifying a user preference by the EA server application from the home EA client application and storing the user preference in the data store by the EA server application, wherein the home EA client application learns the user preference by monitoring user activities.

15. The method of claim 12, further comprising receiving a report identifying a user preference by the EA server application from the home EA client application and storing the user preference in the data store by the EA server application, wherein the home EA client application learns the user preference by prompting the user to input information defining the user preference.

16. The method of claim 12, further comprising receiving a report identifying a user preference by the EA server application from an out-of-home EA client application and storing the user preference in the data store by the EA server application, wherein the out-of-home EA client learns the user preference by monitoring user activities.

17. The method of claim 12, further comprising receiving a report identifying a user preference by the EA server application from an out-of-home EA client application and storing the user preference in the data store by the EA server application, wherein the out-of-home EA client learns the user preference by prompting the user to input information defining the user preference.

\* \* \* \* \*